United States Patent
Griffin et al.

(10) Patent No.: US 10,462,645 B2
(45) Date of Patent: Oct. 29, 2019

(54) DYNAMIC COMMUNICATION PROFILES

(71) Applicant: CISCO TECHNOLOGY, INC., San Jose, CA (US)

(72) Inventors: Keith Griffin, Galway (IE); David Reeckmann, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/477,344

(22) Filed: Apr. 3, 2017

(65) Prior Publication Data

US 2018/0288605 A1 Oct. 4, 2018

(51) Int. Cl.
| | |
|---|---|
| *H04W 8/18* | (2009.01) |
| *H04L 29/08* | (2006.01) |
| *H04W 4/02* | (2018.01) |
| *H04W 64/00* | (2009.01) |
| *H04M 1/725* | (2006.01) |

(52) U.S. Cl.
CPC ............ *H04W 8/18* (2013.01); *H04L 67/18* (2013.01); *H04L 67/22* (2013.01); *H04M 1/72563* (2013.01); *H04W 4/025* (2013.01); *H04W 64/006* (2013.01); *H04M 1/72566* (2013.01); *H04M 1/72569* (2013.01); *H04M 2250/62* (2013.01)

(58) Field of Classification Search
None
See application file for complete search history.

(56) References Cited

U.S. PATENT DOCUMENTS

| | | | | |
|---|---|---|---|---|
| 9,177,150 B1* | 11/2015 | Kay | ........................ | G06F 21/57 |
| 2004/0203768 A1* | 10/2004 | Ylitalo | .............. | H04M 1/72572 |
| | | | | 455/435.1 |
| 2009/0132197 A1* | 5/2009 | Rubin | ............... | H04M 1/72563 |
| | | | | 702/141 |
| 2009/0170480 A1* | 7/2009 | Lee | ........................ | H04L 51/36 |
| | | | | 455/414.1 |
| 2010/0305480 A1* | 12/2010 | Fu | ........................ | A61B 5/0002 |
| | | | | 600/595 |
| 2011/0066366 A1* | 3/2011 | Ellanti | ............... | G01C 21/3438 |
| | | | | 701/533 |
| 2012/0214461 A1* | 8/2012 | Raghavan | ......... | H04M 1/72569 |
| | | | | 455/418 |

(Continued)

OTHER PUBLICATIONS

Santos et al., "Providing User Context for Mobile and Social Networking Applications," Pervasive and Mobile Computing, Jan. 12, 2010, pp. 1-25 http://web.ist.utl.pt/diogo.ferreira/papers/santos10providing.pdf.

(Continued)

*Primary Examiner* — German Viana Di Prisco
(74) *Attorney, Agent, or Firm* — Polsinelli PC (57) ABSTRACT

The disclosed technology addresses the need in the art for a solution that selects an appropriate communication profile for the user. A system is configured to receive motion data from a client device associated with a user, identify a communication profile for the user based on the motion data, administer collaboration requests for the user based on settings associated with the communication profile, track user actions based on the administration of the collaboration requests, and update settings for the active communication profile based on the user actions.

20 Claims, 8 Drawing Sheets

(56) References Cited

U.S. PATENT DOCUMENTS

| | | | | |
|---|---|---|---|---|
| 2013/0331067 A1* | 12/2013 | Coussemaeker | .. | H04M 1/72569 455/412.2 |
| 2014/0357247 A1* | 12/2014 | Assuncao | ......... | H04M 1/72569 455/418 |
| 2015/0369509 A1* | 12/2015 | Schwarz | ............... | H04L 67/125 700/276 |
| 2017/0099295 A1* | 4/2017 | Ricci | ....................... | H04W 4/21 |

OTHER PUBLICATIONS

Lyden, "6 Mobile Applications to Prevent Distracted Driving Accidents," 2017 Automotive Fleet, pp. 1-4 http://www.automotive-fleet.com/article/story/2011/08/6-mobile-applications-to-prevent-distracted-driving-accidents.aspx.

* cited by examiner

DYNAMIC COMMUNICATION PROFILES

TECHNICAL FIELD

The present disclosure pertains to multiparty collaboration, and more specifically to a participant's preferences on the mode of collaboration.

BACKGROUND

There are many different ways in which individuals in different geographical locations collaborate. In some cases, collaboration sessions may be scheduled such that resources such as conference rooms, displays, video conferencing equipment, or audio equipment may be reserved and ready for use by a participant. In these scenarios, a participant's presence, as detected by the device to be used in the collaboration session, is often used as an indication of their availability to communicate. However, this may not accurately represent the participant's ability to communicate across the full range of communication modes (voice, video, or messaging). For example, collaboration may occur more informally such as when two or more individuals communicate over the phone, text, or instant messaging.

Furthermore, many collaboration scenarios may also occur when a participant is mobile or only able to collaborate using a mobile device such as a smartphone. For example, a participant may be able to collaborate while walking to car, driving home, going for a bike ride, or simply resting at home.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

The disclosed technology addresses the need in the art for a more sophisticated and dynamic solution that allows users to establish and maintain a collaboration session while using a mobile device.

Various aspects of the disclosed technology provides a system that leverages user motion to determine a user's status and select an active communication profile based on the user's status. The active communication profile may include settings that help the system determine a mode of collaboration for the user, whether that is a voice call, a video call, text messaging, instant messaging through an application, or other mode of communication provided by the user's mobile device. The communication profile may specify which features (e.g., video calling, voice calls, conferencing features, etc.) are permitted and settings with respect to those features (e.g., volume level for voice calls). Accordingly, when the user receives a collaboration request, the system may administer the collaboration request based on the settings in the active communication profile.

The disclosed technology further relates to learning the user's preferences based on user behavior and refining the settings in the active communication profile accordingly. In some embodiments, the system may track user behavior in response to receiving a collaboration request, learn the user's preferences, and update the appropriate communication profile. For example, the user behavior in response to receiving a collaboration request may be stored in a log of user behavior and used to learn the user's preferences and update the appropriate communication profile.

The user behavior may include any information related to user activity determined by the system or received from a third party. The user behavior may include user actions where the user makes intentional interactions with the system such as, for example, whether the user answers or dismisses a collaboration request replying to a collaboration request in a different mode (e.g., answering a voice request via text), or configuring settings for collaboration requests. The user behavior may also include other information such as a history of user location, user tendencies, or other information.

By monitoring user motion, the system may determine the user's status and automatically select the most appropriate communication profile for the user such that incoming collaboration requests may be handled according to the user's preferences. As the user's status changes, based on the user motion, a different communication profile may become active and incoming collaboration requests may be handled according to the settings in the new active communication profile. Overtime, by monitoring the user's behavior in response to collaboration requests, the system may fine tune the settings for one or more of the user's communication profiles. Accordingly, the user's experience is greatly improved with a simpler and more intuitive process responding to collaboration requests.

Figure 1:
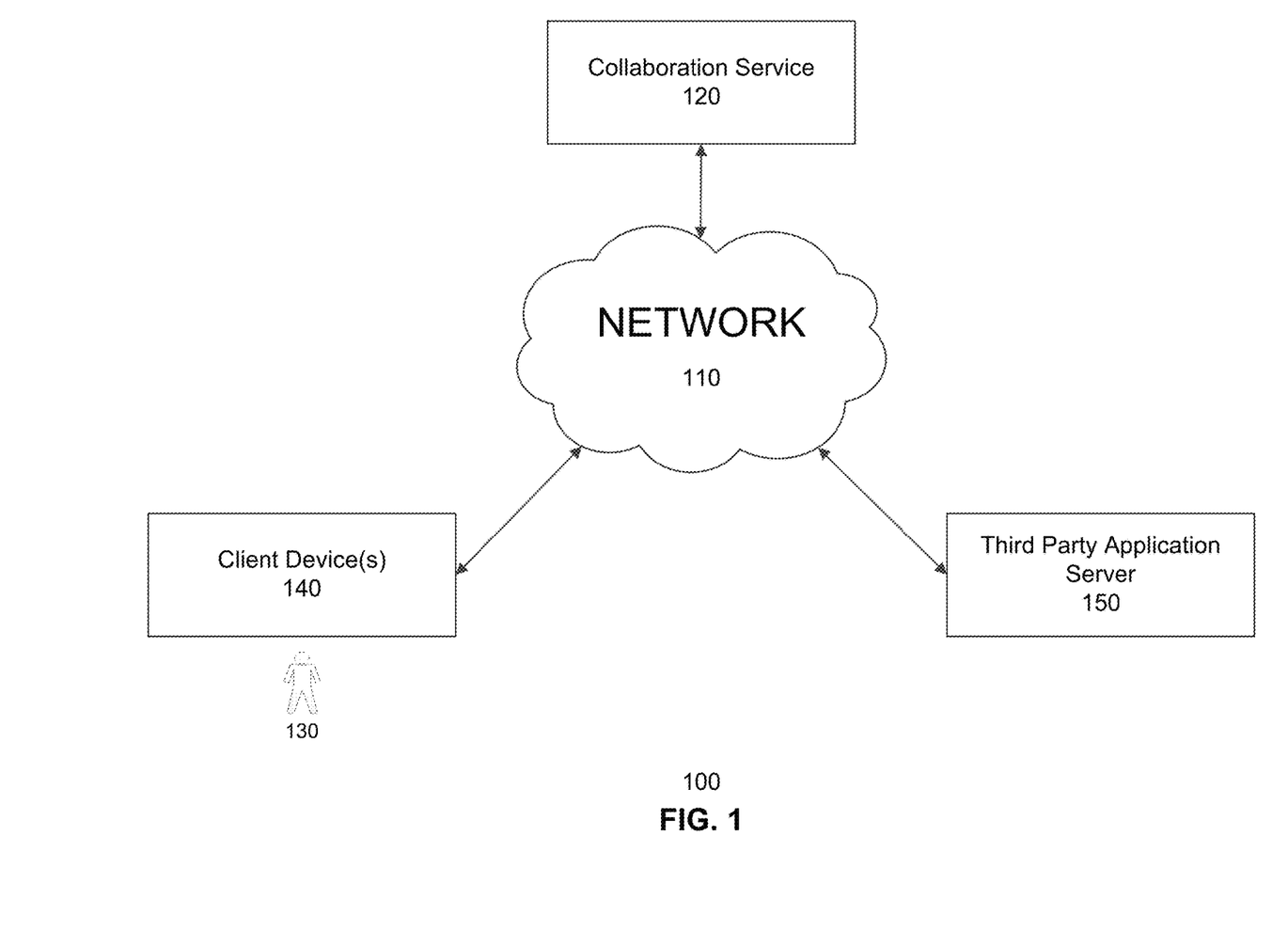
FIG. 1 is a conceptual block diagram illustrating an example network environment, in accordance with various embodiments of the subject technology.

Detailed Description:

FIG. 1 is a conceptual block diagram illustrating an example network environment 100, in accordance with various embodiments of the subject technology. Although FIG. 1 illustrates a client-server network environment 100, other embodiments of the subject technology may include other configurations including, for example, peer-to-peer environments or single-system environments.

The network environment 100 includes a collaboration service 120 server that is in communication with one or more client devices 140 via a network 110. The collaboration service 120 may be configured to manage a user's communication profiles, determine a user status for a user 130, and select a communication profile as an active communication profile based on the user's status. In some embodiments, the collaboration service 120 may further be configured to manage collaboration sessions between a user 130 and one or more other participants in other geographic locations.

In some embodiments, the collaboration service 120 may further be configured to provide an interface for third party application server 120 to access various services related to the user statuses and communication profiles. The third party application server 150 may be configured to provide communication services such as conferencing solutions, voice calls, video calls, text messaging, or instant messaging, although, other types of services are also contemplated.

The network 110 can be any type of network and may include, for example, any one or more of a cellular network, a satellite network, a personal area network (PAN), a local area network (LAN), a wide area network (WAN), a broadband network (BBN), the Internet, and the like. Further, the network 110 can include, but is not limited to, any one or more of the following network topologies, including a bus network, a star network, a ring network, a mesh network, a star-bus network, tree or hierarchical network, and the like. Network 110 can be a public network, a private network, or a combination thereof. Communication network 110 may be implemented using any number of communications links associated with one or more service providers, including one or more wired communication links, one or more wireless communication links, or any combination thereof. Additionally, network 110 can be configured to support the transmission of data formatted using any number of protocols.

The one or more client devices 140 associated with the user 130 may include a number of components that enable the user 130 to participate in collaboration sessions or otherwise communicate with other users. For example, the one or more client devices 140 may include a smart phone that is capable of voice calls, video calls, text messages, or instant messages. Furthermore, the smart phone is able to run a number of applications that may interact with a third party application server 150 and receive services provided by the third party application server 150.

The one or more client devices 140 may also include additional components configured to gather additional data that may be transmitted to the collaboration service 120 and used to determine a user state or select an appropriate communication profile. For example, the one or more client devices 140 may include a pairing interface to detect other devices (e.g., a head set or other hands free device, an automobile, a computer, headphones, speaker systems, conference room devices, etc.). The one or more client devices 140 may also include a microphone or camera to collect audio or visual data that may be used.

The one or more client devices 140 may also include a number of components configured to track the user's motion. The components may include a global positioning system (GPS) device, a gyroscopic sensor, an altimeter, an accelerometer, other motion sensing devices, or a combination of motion sensing components. The components may be in the form of a smart phone, a smart watch, a fitness band, another motion sensing device, or a combination of devices. The motion data collected by the one or more client devices 140 may be transmitted to the collaboration service 120 and used to determine the user's state.

According to some embodiments, the collaboration service 120 may store a number of motion graphs that correspond to activities. These motion graphs may be built by obtaining motion data for a number of users performing a particular activity and generating a reference motion graph based on that data. In some embodiments, a supervised machine learning approach in which seed data in the form of labeled graphs and is then compared against test motion data. The supervised machine learning may further refine the motion graph as additional data is received.

Figure 2:
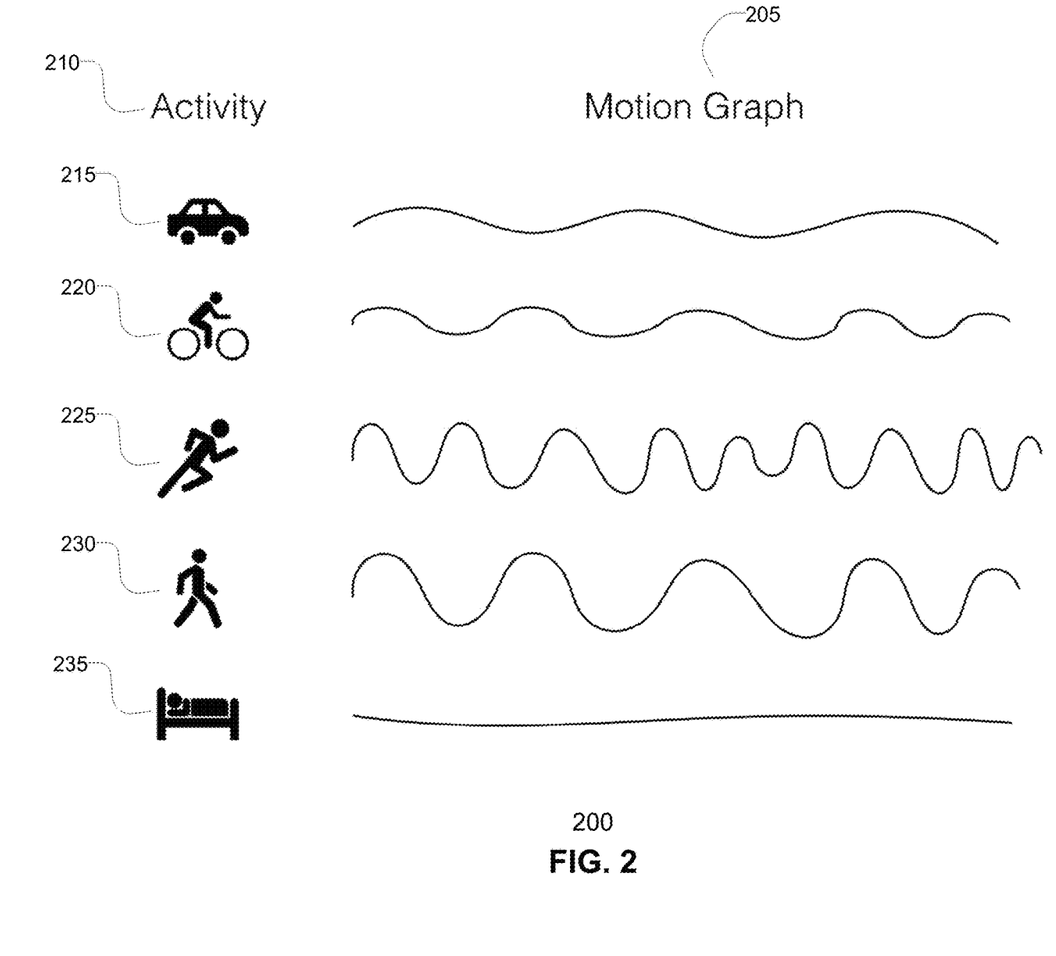
FIG. 2 is a conceptual illustration showing motion graphs for a number of activities, in accordance with various embodiments.

FIG. 2 is a conceptual illustration showing motion graphs for a number of activities, in accordance with various embodiments. FIG. 2 shows a column for motion graphs 205 and a column for their respective activity 210. Each motion graph 205 represents the motion data for the associated activity in the same row. The motion graphs 205 in FIG. 2 are shown as waveforms for illustrative purposes and, in other embodiments, the motion graphs 205 may be any other representation of motion data from one or more client devices. Furthermore, in FIG. 2, the motion graphs 205 all correspond to an explicit activity such as riding in a car 215, riding a bicycle 220, running 225, walking 230, or sleeping 235. However, in other embodiments, other activities may be used and, in some cases, motion graphs may not be tied to an explicit activity but instead by tied to a category of motion data such as a category learned through machine learning techniques.

The collaboration service 120 may obtain motion data for a large number of users and generate activity categories and their respective motion graphs. In some cases, the motion data may be linked to specific activities, however, in other cases, the motion data may be unlabeled. In some embodiments, machine learning techniques may be used to categorize motion data in a data set into labeled or unlabeled activity categories, each with one or more associated motion graphs. As additional motion data is received, the motion graphs for the various activity categories managed by the collaboration service 120 may be updated and refined.

Returning to FIG. 1, a client device 140 associated with a user 130 may collect motion data for the user and transmit the motion data to the collaboration service 120 via the network 110. The collaboration service 120 may compare the motion data received from the client device 140 with motion data associated with the various activities or categories in order to select an activity that best matches the motion data from the client device 140. The motion data may include, for example, speed, bumps in motion, and location data (e.g., global positioning system (GPS) coordinates). The user's speed may help, for example distinguish between a running activity, a walking activity, a biking activity, a driving/riding activity, or a resting activity. Bumps in motion may also help distinguish between these activities. The collaboration service 120 may further obtain mapping data from a third party mapping service and overlay a history of location data for the user in order to determine whether the user is on a roadway, bike trail, train track, bus line, ferry route, or other transportation medium in order to aid in determining an activity associated with the user 130.

Once the collaboration service 120 selects an activity that best matches the motion data from the client device 140, the collaboration service 120 may set the user status for the user 130 based on the selected activity. According to some embodiments, the collaboration service 120 may further select a communication profile based on the user status. For example, if the user status is "running," the communication profile for the running user status may specify that voice calls are permitted, but text messaging or instant messaging is not permitted. The communication profile for each user status may be selected and configured by the user, preset by the collaboration service 120, learned by the collaboration service 120 through supervised learning techniques, or a combination. Once the communication profile is selected, the collaboration service 120 may send the selected communication profile to the client device 140 where it is implemented.

According to some embodiments, the client device 140 may transmit additional information to the collaboration service 120 to aid in determining the user status and selecting an appropriate communication profile for the user 130. Peripheral sensor input, for example, may be sent to the collaboration service 120. The peripheral sensor input may include, devices that are detected or paired with the client device 140 (e.g., hands free device, head set, automobile Bluetooth device, etc.), timestamp data, audio data, or video data.

In some embodiments, a list of detected or paired devices may be used by the collaboration service 120 to determine the user status and to select an appropriate communication profile. For example, if the collaboration service 120 determines that the user 130 is riding a bicycle and determines that a hands free device or headset is paired with the client device 140, the collaboration service 120 may select a communication profile where voice calls are permitted but text messages are not. If no hands free device or headset is paired with the client device 140, the collaboration service 120 may determine that both voice calls and text messages are not permitted. Audio and video data may also be used by the collaboration service 120 to determine the user status and to select an appropriate communication profile. For example, audio data and video data may be used to determine whether a user is at home sleeping or awake based on audio levels, light levels, or a combination of data captured by a microphone and camera in communication with the client device 140.

Figure 3:
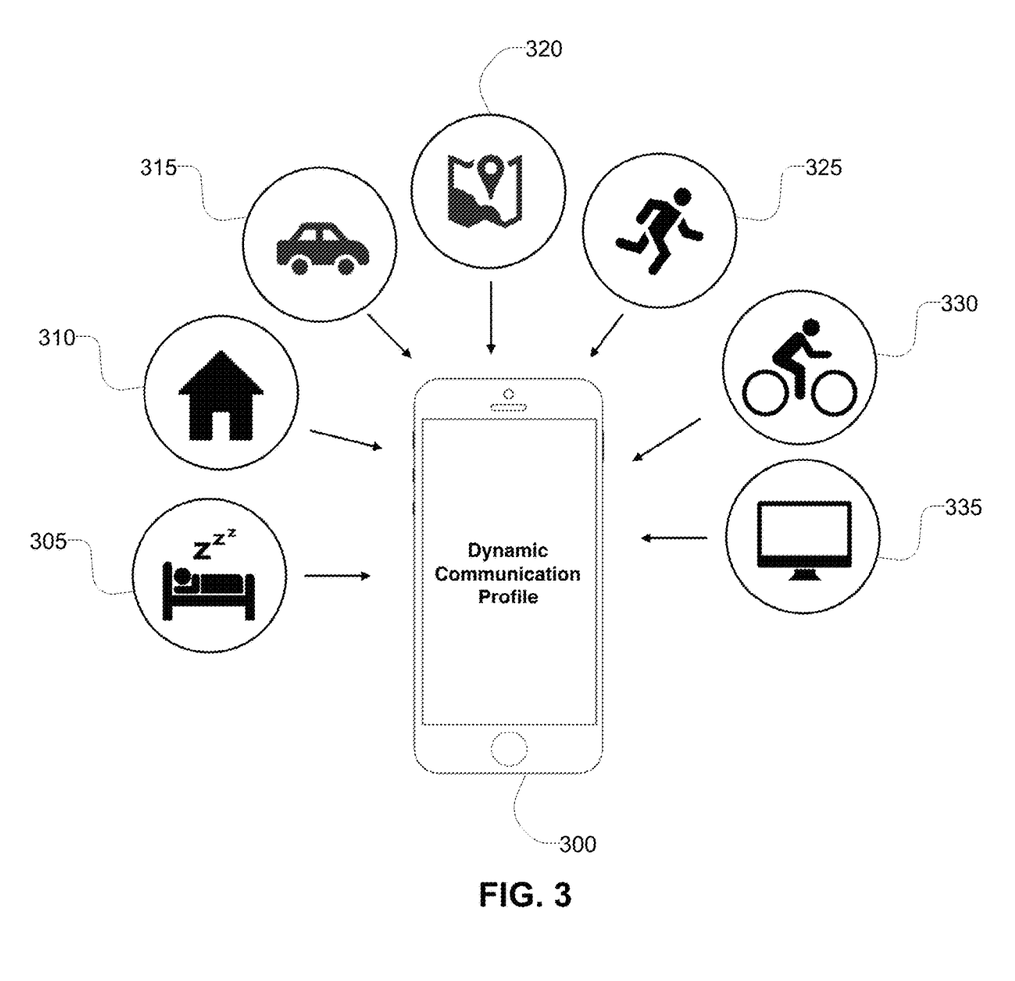
FIG. 3 is a conceptual illustration showing the receipt and implementation of communication profiles by a client device, in accordance with various embodiments.

FIG. 3 is a conceptual illustration showing the receipt and implementation of communication profiles by a client device 300, in accordance with various embodiments. For example, after sending motion data and peripheral sensor data to a collaboration service, the collaboration may determine that the user status is a "driving" user status, select a communication profile that is appropriate for driving, and transmit instructions to the client device to implement the selected communication profile. As an example, the client device may be instructed to implement communication profile 315 for driving, which may allow for voice calls through a hands free device, head set, or car audio equipment, but may prohibit text messages or instant messages while moving.

As time passes, the client device 300 continues to transmit motion data and peripheral sensor data to the collaboration service and the collaboration service may update the user status based on how the received data matches data associated with the various activities or categories. If the collaboration service there is a change in user status, the collaboration service may select a new communication profile and transmit instructions to the client device to implement the new communication profile. Accordingly, the communication profiles implemented by the client device 300 are dynamic and may be automatically updated by the collaboration service with little or no user interaction. Example communication profiles illustrated in FIG. 3 include a communication profile for a "sleeping" user state 305, a communication profile for a "at home" user state 310, a communication profile for a "driving" user state 315, a communication profile for a "at work" user state 320 or a user state for when the user is at another point of interest, a communication profile for a "running" user state 325, a communication profile for a "biking" user state 330, and a communication profile for a "at user's desk" user state 335.

According to various embodiments of the subject technology, user input may also be used by the collaboration service to determine a user status and an appropriate communication profile. For example a user may be presented with one or more questions that will help the collaboration service determine a user status, select an appropriate communication profile, or configure a communication profile to better fit the needs or preferences of the user.

Figure 4:
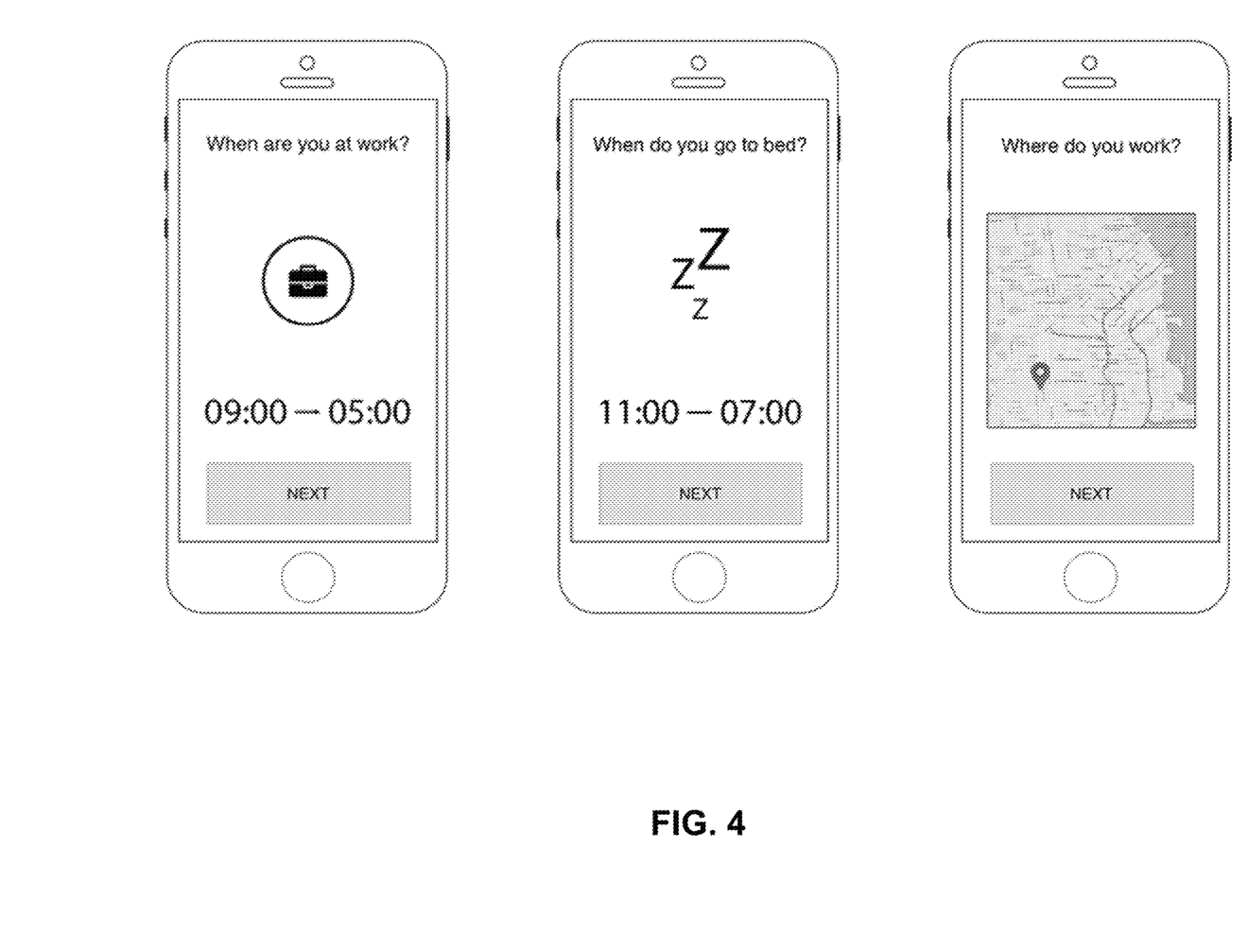
FIG. 4 is an illustration of three different user prompts, in accordance with various embodiments.

FIG. 4 is an illustration of three different user prompts, in accordance with various embodiments. In FIG. 4, the user is prompted visually on the user's client device, however the user may be prompted by other means as well. The user is asked when the user is at work, when the user goes to bed, and where the user works. The user input provided in response to these prompts may aid the collaboration service in determining whether the user status is "at work" (e.g., if the current timestamp is within work hours and the user is located at or near the location of the user's work) or if the user status is asleep (e.g., if the current timestamp is within sleeping hours and the user is located at a home location).

In FIG. 4, the user prompts are configured to aid the collaboration service in determining the user status, but other prompts may aid the collaboration service in selecting an appropriate communication profile, creating a new communication profile, or configuring an existing communication profile to better fit the needs or preferences of the user. For example, the user may be asked whether the user would like to answer voice calls in the car, whether the user would like to answer video calls in the car, whether the user would like to receive text messages or instant messages while walking, etc. The user input provided in response to these questions may help the collaboration service select, create, or configure an appropriate communication profile for certain activities.

According to various embodiments of the subject technology, user behavior or actions may also be used by the collaboration service to select an appropriate communication profile, create a new communication profile, or configure an existing communication profile to better fit the needs or preferences of the user. For example, the client device may transmit user behavior data to the collaboration service. The collaboration service may track user behavior and responses to see if modifications to a communication profile for a particular user status are appropriate. If, for example, a user receives a number of voice calls when the user is driving but rarely if ever picks up a voice call, the collaboration service may update the communication profile for a "driving" user status to prohibit voice calls. In some embodiments, before making such a change to the communication profile, the collaboration service may be prompted or notified of such a change. For example, the user may be prompted with a message stating "We notice that you do not answer voice calls while driving. Would you like to turn off future voice calls when driving?" Alternatively, the user may be notified that "We notice that you do not answer voice calls while driving. We will turn off voice calls when you are driving in the future. Please visit the settings page to change this."

Figure 5:
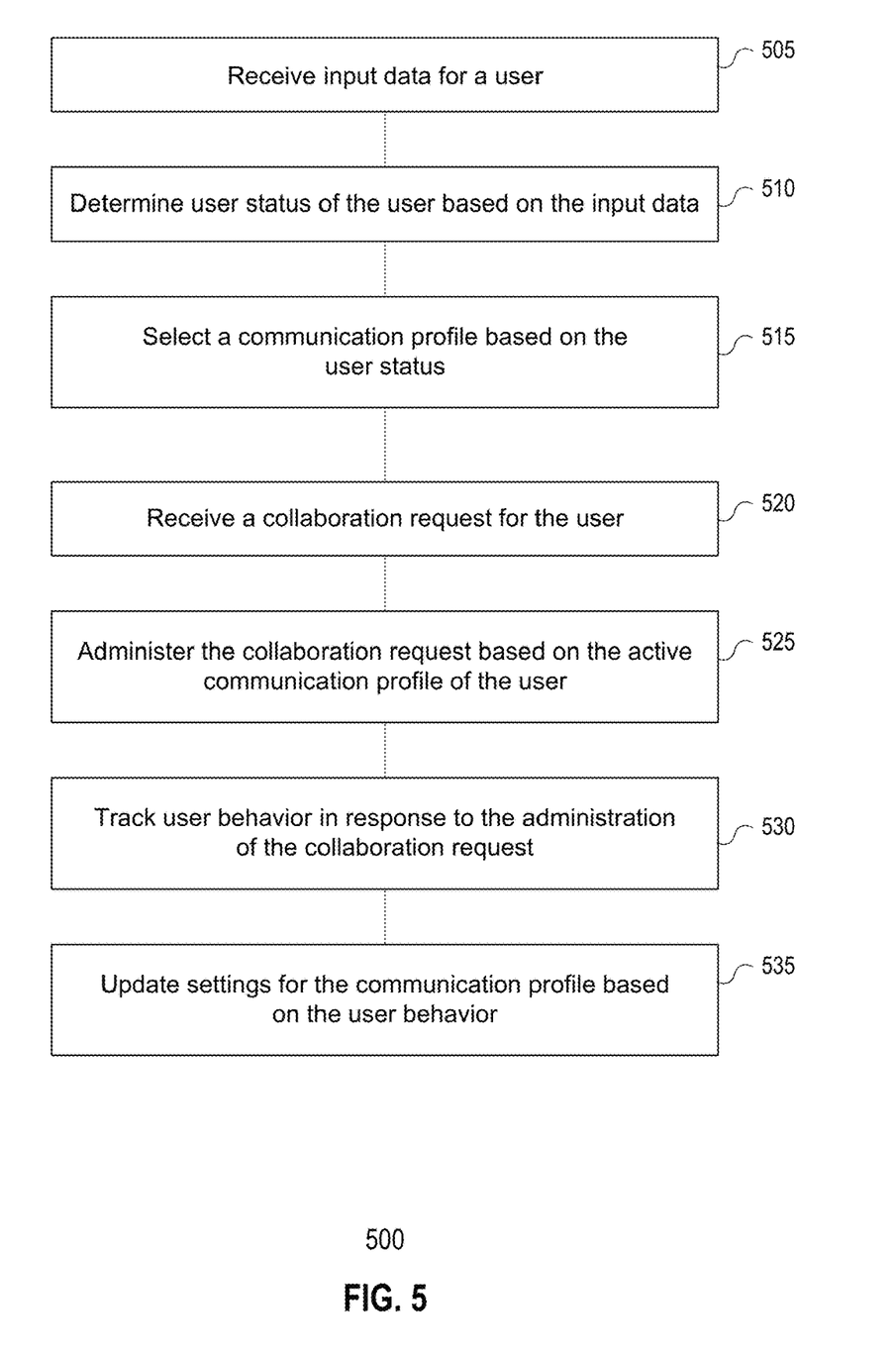
FIG. 5 shows an example method for implementing a communication profile, in accordance with some embodiments.

FIG. 5 shows an example method 500 for implementing a communication profile, in accordance with some embodiments. Although the methods and processes described herein may be shown with certain steps and operations in a particular order, additional, fewer, or alternative steps and operations performed in similar or alternative orders, or in parallel, are within the scope of various embodiments unless otherwise stated. For example, in some embodiments, the method 500 may include additional operations to set up a user's account or prompt a user for input that may help in determining a user status or creating, configuring, or selecting an appropriate communication profile for a user.

Method 500 may be implemented by a system which may be embodied as one or more collaboration service servers, one or more client devices, a third party server, or a combination. At operation 505, the system receives input data for a user. The input data may include user input, motion data, peripheral sensor data, or a combination thereof. The input data may be received from a client device or a third party provider of data.

At operation 510, the system determines, based on the input, a user status for the user. For example, the system may attempt to match motion data received with motion graphs for activities. If a motion graph associated with an activity matches the motion data for the user, the system may set the user status to be the activity. The system may also use peripheral sensor data and user input (e.g., user responses to questions) to aid in the determination of the user status. For example, time-of-day information (e.g., timestamp data), ambient noise levels, and user indicated time of sleep may be used to help determine if a user is asleep or merely at home resting. Furthermore, location coordinates, third party mapping data, time-of-day, and a connection to a car Bluetooth system may be used to help determine whether a user is driving to work.

Once a user status is selected, at operation 515, the system may select a communication profile based on the user status. For example, if the user status is "riding a bicycle," the system may select a communication profile associated with "riding a bicycle" that prohibits text messages and instant messages. In some embodiments, additional input data for the user may also be used to select an appropriate communication profile. For example, if user input previously provided by the user indicates that the user likes to answer voice calls while driving and the user status is driving, the system may select an appropriate communication profile that allows for voice calls while driving. In another scenario, the user status may be "riding a bike" and the peripheral sensor data may indicate that a headset is paired with the user's client device. Accordingly, the system may select a communication profile associated with riding a bike with a paired headset device rather than a communication profile associated with riding a bike without a paired device.

In some embodiments where the system is a collaboration service, the collaboration service may transmit the communication profile or a reference to the communication profile to the user's client device to be implemented by the client device. In some embodiments, the collaboration service may be configured to handle collaboration requests for the user and, as a result, the collaboration service need not transmit the communication profile to the client device. Instead, the collaboration service may implement the selected communication profile and administer subsequent collaboration requests based on the selected communication profile.

According to some embodiments, the system may continue to receive input data for the user and update the user status if necessary (e.g., when the user stops an activity or changes from one activity to another). The system may further update the selection of a communication profile based on the change in user status or a change in motion data, user input, peripheral sensor data, or other user input.

At operation 520, the system may receive a collaboration request for the user. The collaboration request may include a voice call, a video call, a text message, an instant message, a conference call, or any other form of communication that may be provided via a collaboration service, a client device, or a third party service. In some embodiments, a collaboration request may be implemented with various features either in combination or separately. For example, a collaboration request may include, among other things, video conferencing features, voice calling features, presentation features, share-screen features, recording features, or multi-party conferencing features. As such, the collaboration request may be administered in various ways such as allowing all features or allowing only some features while prohibiting other features. Each communication profile may include settings that dictate how a collaboration request is to be handled and which features are allowed, prohibited, or limited.

When the collaboration request for the user is received, the system may access the active communication profile (e.g., the communication profile currently selected) and, at operation 525, administer the collaboration request based on the selected communication profile. For example, the selected communication profile may be for "riding a bicycle with headset paired" that allows for voice calls, but prohibits text messages, instant messages, and video calls. If the system receives a text message, the system may simply route the text message to a received messages storage without notifying the user who is likely to be riding a bicycle. If the system receives a video call in this scenario, the system may attempt to limit the call to voice calling only (e.g., without video features) or route the video call to a missed call section. Similarly, if the system receives a conference call capable of supporting voice calls, video calls, instant messaging, as well as other conferencing features, the system may limit the conference call to voice calling features only. If the system receives a voice call, the system may allow the call to go through since this feature is explicitly allowed according to the selected communication profile.

At operation 530, the system tracks user behavior in response to the administration of the collaboration request. The user behavior may include, for example, answering a collaboration request, not answering a collaboration request, dismissing a collaboration request, replying to a collaboration request via text (e.g., a text message or instant messaging), configuring or changing the settings for communications initiated in response to a collaboration request, or changes in the motion data in response to receiving a collaboration request.

The user behavior in response to the administration of the collaboration request or a number of collaboration requests may help the system refine the communication profile selected based on the user status. For example, at operation 535, the system may update settings for the communication profile based on the user behavior.

In an illustrative scenario, the user status may be "driving" and the selected communication profile for the "driving" user status may specify that voice calls are permitted, but text messages and video calls are not permitted. The system may detect and record user behaviors in response to collaboration requests that include voice calls while in the "driving" user status. Based on a history of the user not answering voice calls while in the "driving" user status, the system may determine that the user does not want to permit voice calls in the communication profile selected for the "driving" user status. Accordingly, the system may update the communication profile selected for the "driving" user status to not permit voice calls. In another embodiment, the system may request user confirmation of the change to the communication profile. For example, the system may prompt the user "We notice that you do not answer any calls while you are driving. Should we direct calls directly to voicemail?" If the user answers in the affirmative, the system may update the communication profile to direct voice calls to voicemail.

According to various embodiments, the system may use various techniques to analyze motion data, peripheral sensor data, user behavior, and other user data to improve user status determination, communication profile selection, and communication refinement. The system may learn the user's preferences using, for example, machine learning, supervised learning, unsupervised learning, deep learning using deep neural networks, or other learning techniques.

According to some embodiments, the system may collect motion data, peripheral sensor data, user behavior data, and other user data from a number of users, aggregate the collected data into a database store, and analyze the aggregated data to help generate motion graphs using, for example, machine learning techniques. The motion graphs may be tied to a labeled or identifiable activity (e.g., "driving," "walking," "sleeping," etc.). Alternatively, machine learning techniques may generate a motion graph linked to a category of motion data that is unlabeled. The input data aggregated across a number of users may also be used to configure default communication profiles and link communication profiles with particular user statuses.

Figure 6:
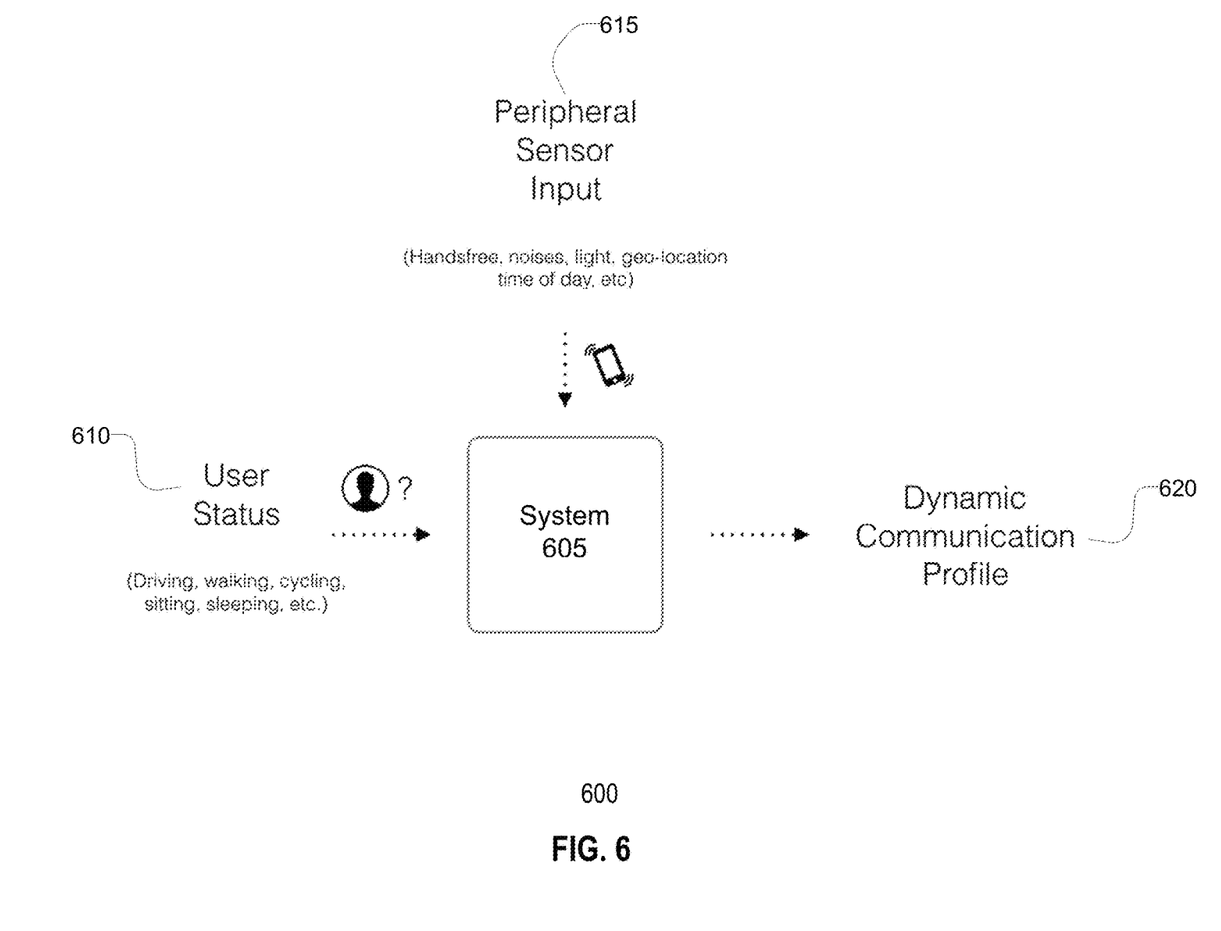
FIG. 6 is a conceptual illustration showing the selection of a dynamic communication profile, in accordance with various embodiments.

FIG. 6 is a conceptual illustration 600 showing the selection of a dynamic communication profile, in accordance with various embodiments. As illustrated in FIG. 6, a system 605 may be configured to determine a user status 610 for a user. The user status may be based on motion data received from a client device associated with the user, user input, or peripheral sensor input 615. The system 605 may select a dynamic communication profile 620 for the user based on the user status 610 and, in some cases, peripheral sensor input 615. The selected dynamic communication profile 620 may be implemented by the system 605 or transmitted to a client device for implementation. Furthermore, in some embodiments, the collection of motion data and peripheral sensor input, the determination of user status, and the updating of the dynamic communication profile may continue such that the currently active communication profile may automatically remain up to date with respect to what the user is doing and the data collected for the user. Aspects of the subject technology create a more personalized experience for the user and improve convenience for the user by automatically updating the communication profile for the user with little or no additional burden on the user.

Figure 7:
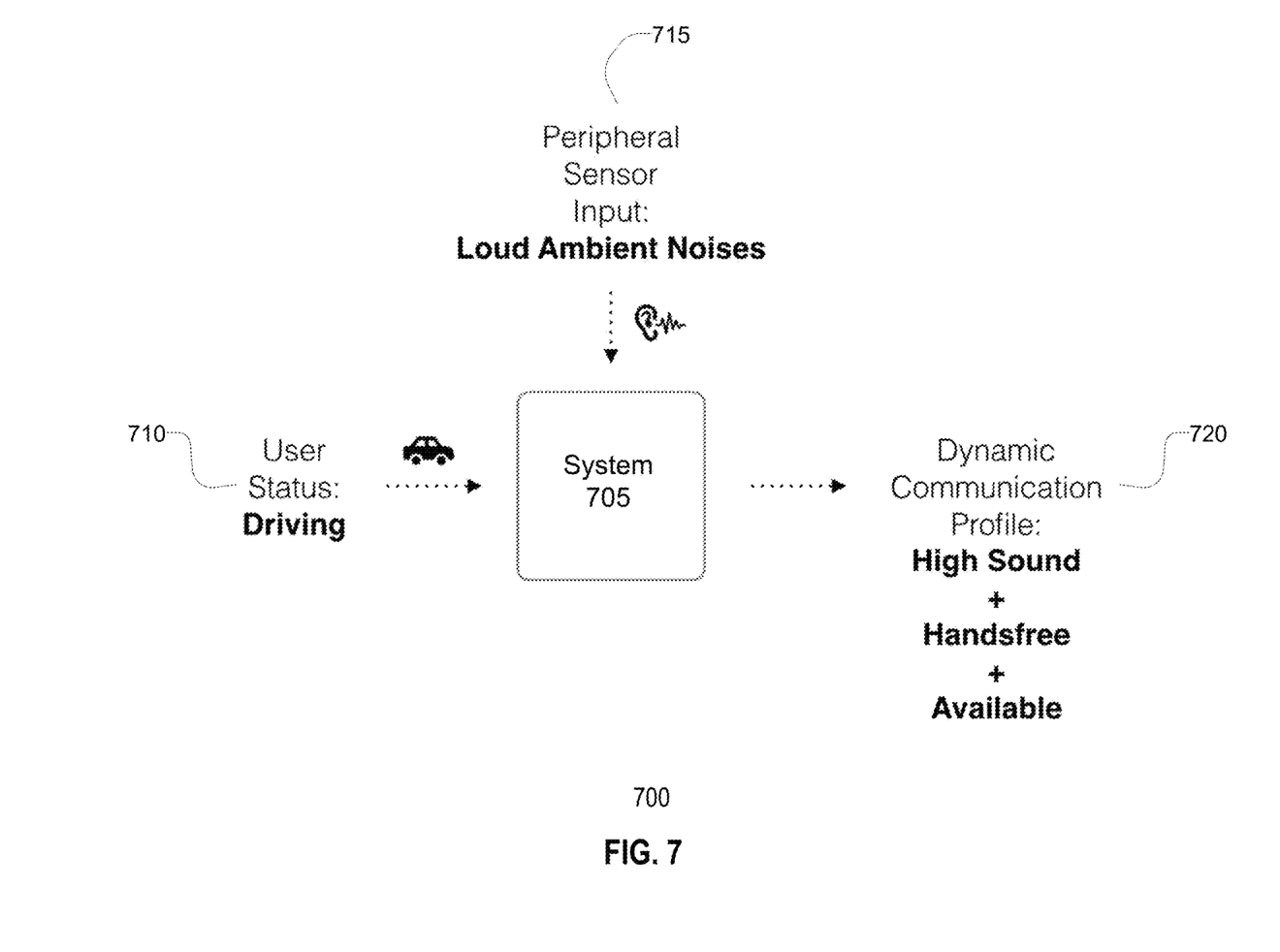
FIG. 7 is a conceptual illustration showing a scenario in which a system selects a dynamic communication profile, in accordance with various embodiments.

FIG. 7 is a conceptual illustration 700 showing a scenario in which a system selects a dynamic communication profile, in accordance with various embodiments. As illustrated in FIG. 7, a system 705 may be determine, based on motion data or other data associated with a user, that a user status 710 for the user is "Driving." The system 705 may also receive peripheral sensor input such as a signal that loud ambient noises are detected by a client device associated with the user. Based on the user status 710 and peripheral sensor input 715, the system selects a dynamic communication profile 720 for the user. In FIG. 7, the system 705 is shown selecting a dynamic communication profile 720 that specifies that the user is available to receive collaboration requests while driving, that collaboration requests should be handled using a hands-free device paired with the client device, and that the call volume should be set to high in order to combat the loud ambient noises detected by the user's client device.

According to various embodiments of the subject technology, a collaboration service may also provide user status or communication profile services to a third party service. For example, a third party communication service may provide communication services to a user through an application running on the user's client device. When the third party service receives a communication request for the user, the third party service may request user status information of communication profile information for the user from the collaboration service. In response to the request, the collaboration service may provide the third party service with user status information or communication profile information. The third party service may then administer the communication request for the user based on the communication profile. Furthermore, in some cases, the third party service may receive user behavior data or user action data in response to the administration of the communication request by the third party service. The behavior data may be sent to the collaboration service in order to help in the determination of the user status, the selection of a communication profile, or the updating of communication profile settings.

Figure 8A:
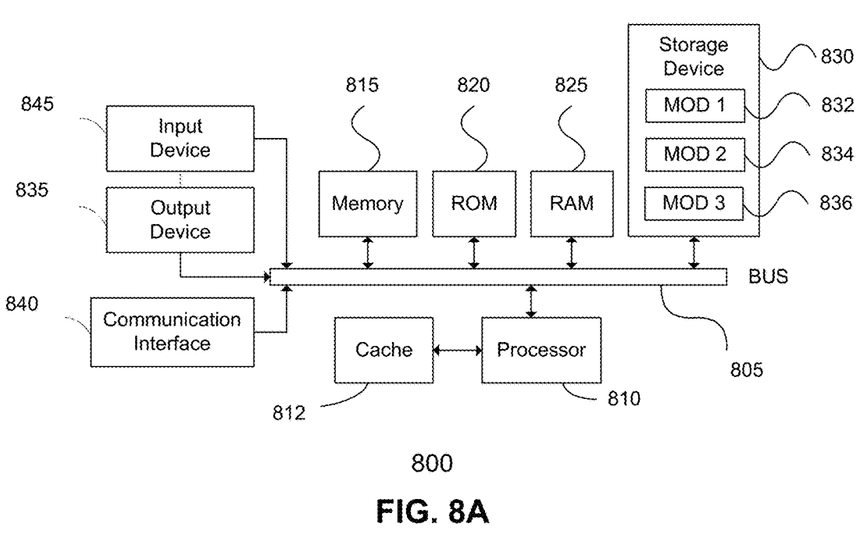
FIGS. 8A and 8B show example possible system embodiments.
Figure 8B:
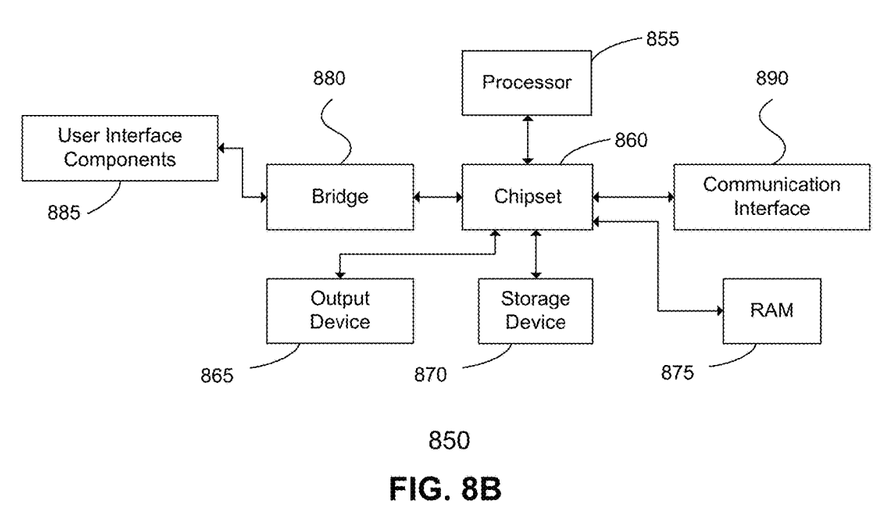

FIG. 8A, and FIG. 8B show example possible system embodiments. The more appropriate embodiment will be apparent to those of ordinary skill in the art when practicing the present technology. Persons of ordinary skill in the art will also readily appreciate that other system embodiments are possible.

FIG. 8A shows a conventional system bus computing system architecture 800 wherein the components of the system are in electrical communication with each other using a bus 805. Example system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B shows a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor or be part of a group or cluster of computing devices networked together to provide greater processing capability. The processor may include a central processing unit (CPU), a graphic processing unit (GPU), other processing units, or a combination thereof.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving a collaboration request for a user;
receiving user motion data from a client device associated with the user;

determining a user status by matching the user motion data from the client device with a motion graph;
identifying a communication profile for the user based on the user status;
administering, via the client device, the collaboration request based on settings associated with the communication profile;
detecting a user behavior based on administration of the collaboration request, the user behavior being a change to the user motion data, in response to receiving the collaboration request, repeated a plurality of times over a period of time; and
updating the settings associated with the communication profile to yield new settings based on the user behavior repeated the plurality of times over the period of time, the updating of the settings including a notification to the user of the new settings with an instruction for how to change the new settings.

2. The computer-implemented method of claim 1, further comprising:
selecting, based on the user status, the communication profile from a set of available communication profiles.

3. The computer-implemented method of claim 2, wherein the user motion data comprises at least one of gyroscopic motion data, location data, or altitude data.

4. The computer-implemented method of claim 2, further comprising:
receiving peripheral sensor data from the client device associated with the user,
wherein the determining of the user status is further based on the peripheral sensor data.

5. The computer-implemented method of claim 4, wherein the peripheral sensor data comprises at least one of a timestamp, audio data, video data, or device pairing information.

6. The computer-implemented method of claim 1, wherein the instruction includes a page to visit to change the new settings.

7. The computer-implemented method of claim 1, further comprising:
storing the user behavior in a log comprising a plurality of user responses to a plurality of administrations of collaborative requests,
wherein the updating of the settings for the communication profile is based on the log.

8. The computer-implemented method of claim 1, wherein the collaboration request is received from a third-party server.

9. The computer-implemented method of claim 1, wherein the users status comprises at least one of a running status, a walking status, a driving status, or a sleeping status.

10. The computer-implemented method of claim 1, wherein the communication profile comprises settings for handling collaboration requests from a collaboration service.

11. A non-transitory computer-readable medium comprising instructions, the instructions, when executed by a computing system, cause the computing system to:
receive user motion data from a client device associated with a user;
determine a user status based on the user motion data by matching the user motion data from the client device with a motion graph;
select, based on the user status, an active communication profile comprising settings for communication with the user;
receive a communication request for the user;
administer, via the client device, the communication request based on the active communication profile;
detect user action in response to administration of the communication request, the user action being a change to the user motion data, in response to receiving the communication request, repeated a plurality of times over a period of time; and
update the settings for the active communication profile based on the user action to yield new settings based on the user action repeated the plurality of times over the period of time, the update of the settings including a notification to the user of the new changes and an instruction for how to change the new settings.

12. The non-transitory computer-readable medium of claim 11, wherein the user motion data comprises at least one of gyroscopic motion data or location data.

13. The non-transitory computer-readable medium of claim 11, wherein the instructions further cause the computing system to:
receive peripheral sensor data from the client device associated with the user,
wherein the user status is further determined based on the peripheral sensor data.

14. The non-transitory computer-readable medium of claim 11, wherein the instruction includes a page to visit to change the new settings.

15. A system comprising:
a processor; and
a non-transitory computer-readable medium storing instructions that, when executed by the system, cause the system to:
receive motion data from a client device associated with a user;
identify a communication profile for the user based on the motion data by matching the motion data from the client device with a motion graph;
administer, via the client device, collaboration requests for the user based on settings associated with the communication profile;
track user actions based on administration of the collaboration requests, the user actions being changes to the motion data, in response to receiving the collaboration requests, repeated a plurality of times over a period of time; and
update the settings associated with the communication profile to yield new settings based on the user actions repeated the plurality of times over the period of time, the update of the settings including a notification to the user of the new settings with an instruction for how to change the new settings.

16. The system of claim 15, wherein the non-transitory computer-readable medium further stores instructions that, when executed by the system, cause the system to:
receive peripheral sensor data from the client device associated with the user,
wherein identification of the communication profile for the user is further based on the peripheral sensor data.

17. The system of claim 16, wherein the peripheral sensor data comprises at least one of a timestamp, audio data, video data, or device pairing information.

18. The system of claim 16, wherein at least one collaboration request is received from a third-party server.

19. The system of claim 16,
wherein,
the motion graph is one of a plurality of motion graphs, each of the plurality of motions graphs associated with an activity, and the communication profile for the user is identified based on the activity of the motion graph.

20. The system of claim 16, wherein the motion data comprises at least one of gyroscopic motion data or location data.

\* \* \* \* \*